Sept. 6, 1966 JEAN-PIERRE CATTANEO 3,271,490
METHOD FOR FABRICATING TUBES
Filed Oct. 5, 1962 2 Sheets-Sheet 1

INVENTOR.
JEAN-PIERRE CATTANEO
BY Harold P. Beck
ATTORNEY

FIG. 6    FIG. 7
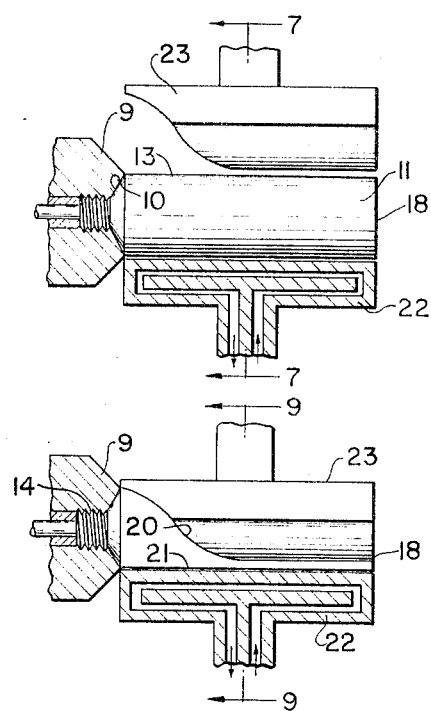
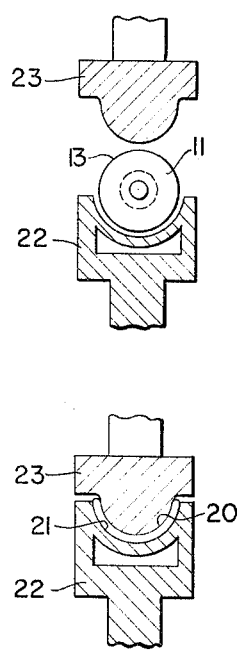
FIG. 8    FIG. 9
INVENTOR.
JEAN-PIERRE CATTANEO
BY Harold R. Beck
ATTORNEY United States Patent Office 3,271,490
Patented Sept. 6, 1966

3,271,490
METHOD FOR FABRICATING TUBES
Jean-Pierre Cattaneo, Geneva, Switzerland, assignor to Rexall Drug and Chemical Company, Los Angeles, Calif., a corporation of Delaware
Filed Oct. 5, 1962, Ser. No. 229,285
Claims priority, application Switzerland, Jan. 31, 1962, 1,246/62
3 Claims. (Cl. 264—92)

This invention relates to the manufacture of plastics squeezable tubes.

Known squeezable tubes made of plastics material suffer from the drawback that they resume their original shape after squeezing out a certain quantity of their contents. Accordingly, it is generally impossible to determine at a glance whether such tubes are full, partially empty or completely empty.

An object of the present invention is to overcome this drawback.

According to one aspect of the invention there is produced a collapsible tube made of plastics material.

This invention also provides, according to another aspect, a method of producing a collapsible tube from a plastics squeezable tube having a generally tubular body portion and a head portion at one end of said body portion, said method comprising the step of annulling the convexity of the outer surface of at least part of at least one axial half of said body portion whereby said part comes to lie adjacent a corresponding part of the other axial half of said body portion.

Moreover, the invention provides, according to a further aspect, an apparatus used for producing a collapsible tube from a plastics squeezable tube having a generally tubular body portion and a head portion at one end of said body portion, said apparatus comprising heat and pressure deforming means for permanently deforming at least part of at least one axial half of said body portion by heat and pressure to cause said part to fall in and to come and lie adjacent a corresponding part of the other axial half of said body portion.

For a better understanding of the invention and to show how the same may be carried into effect, reference will now be made to the accompanying diagrammatic drawings in which:

FIGURE 6 is an elevational view of a second embodiment of an apparatus used according to the invention and illustrates one step in the operation of the apparatus;

FIGURE 7 is a cross-section taken along the line VII—VII of FIGURE 6;

FIGURE 8 is an elevational view similar to that of FIGURE 6 illustrating another step in the operation of the apparatus; and FIGURE 9 is a cross section taken along the line IX—IX of FIGURE 8.

Figure 1:
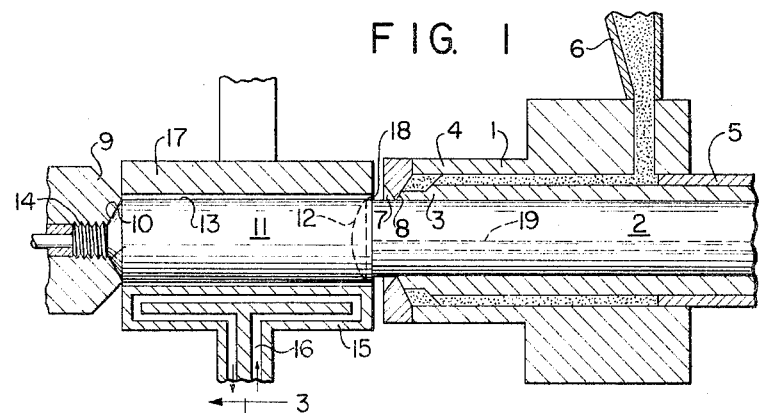
FIGURE 1 is an elevational view of a first embodiment of an apparatus used according to the invention and illustrates one step in the operation of the apparatus.

The two illustrated forms of apparatus may each comprise the same basic structure as that of known apparatus for manufacturing squeezable tubes made of plastics material, e.g. the basic structure of the apparatus disclosed in Parmelee's U.S. Patent No. 2,443,053 or of the apparatus disclosed in Guignard U.S. patent application Serial No. 795,504. As in the latter disclosure, the apparatus illustrated in FIGURE 1 comprises a nozzle unit 1 carried by a frame (not shown). In this nozzle unit 1 is mounted an axially slidable core 2. This core 2 is surrounded by a tubular member 3 controlled by a servomotor adapted to impart to the core 2 predetermined axial displacements within a sleeve 4 of the nozzle unit. Between the sleeve 4 and the tubular member 3 is arranged an annular piston 5 for compressing heated plastics material introduced into the space between the sleeve 4 and the tubular member 3 through a hopper 6. The tubular member 3 serves to distribute heated plastics material through the annular outlet 7, between the core 2 and an annular lip 8, of the nozzle unit 1. This nozzle unit 1 is adapted to cooperate with a die member 9 to form a collar 10 of the head portion of a tube 11. In this connection, it should be noted that, at the initial stage of the manufacture of a tube, the die member 9 is in sealing engagement with the nozzle lip 8 and the core 2 occupies a retracted position within the nozzle unit 1. A forward movement of the piston 5 then causes the injection of heated plastics material into the moulding space between the die member 9 and the end face 12 of the core 2 to form the collar 10. The next step in the operation of the apparatus consists in moving the die member 9 away from the head 1 together with the core 2 and in simultaneously extruding an additional quantity of heated plastics material through the nozzle outlet 7 around the core 2 to form a generally tubular body portion or skirt 13 integral with the head portion of the tube 11. Then, as shown in FIGURE 1, the core 2 is mostly withdrawn from the tube 11 which remains secured to the die member 9 by a threaded axially apertured neck 14 with which the head portion of the tube is provided. Now, the two forms of apparatus illustrated in the drawings additionally comprise a device which is brought into action before removing the tube 11 from the apparatus to deform part of the generally tubular skirt 13 of the tube and to bring this part into substantially parallel or contiguous relationship with the remainder of the skirt, the shape of the remainder of the skirt remaining unaltered.

Figure 2:
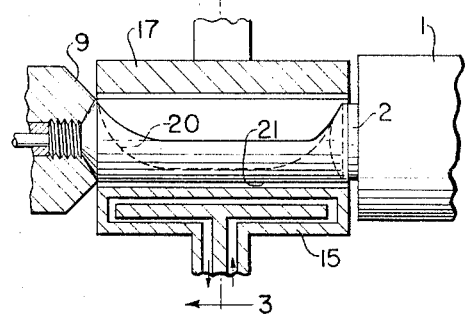
FIGURE 2 is a view similar to that shown in FIGURE 1 illustrating another step in the operation of the apparatus.

In the first form of embodiment illustrated in the drawings, this device comprises a generally shell-like member 15 adapted to be moved (for example by means of a servo-motor, not shown) into supporting engagement with the part of the skirt 13 intended to preserve its shape, this shell-like member having to this end a concave supporting surface which is strongly cooled by, for example, circulating cooling water through conduits 16 in the member 15. Opposite the member 15 is provided a heat radiating member 17 which can also be moved by a servo-motor (not shown). This heat radiating member 17 may either be of the electric resistance type, or of the type involving the circulation of a heated fluid, e.g. steam. Members 15 and 17 are intended to be moved adjacent the body portion of tube 11 and to come into operation when the rear end portion 18 of the tube is still in engagement with the free end portion of core 2. The device then operates as follows:

The heat radiated by the member 17 causes the material of skirt 13 adjacent member 17 to soften and it then suffices to subject the interior of the tube to a slight vacuum, for example with the aid of a suction channel 19 extending axially through the core 2, to cause the heated part of the skirt to fall in towards the opposite part, whose initial shape is preserved by the strongly cooled concave supporting surface of the member 15. The tube then has the appearance shown in FIGURE 2, i.e. its skirt 13 has a part 20 of externally concave form which lies parallel to and adjacent the skirt part 21 maintained in its externally convex shape. The tube is then finished and can be removed from the apparatus by fully retracting the core 2 within the nozzle unit 1 and by extracting the threaded neck 14 from the die 9.

Figure 4:
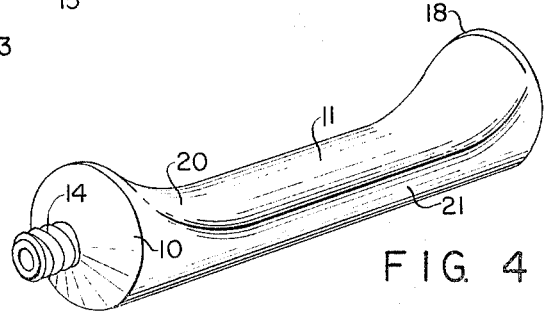
FIGURE 4 is a perspective view of the resultant tube.
Figure 5:
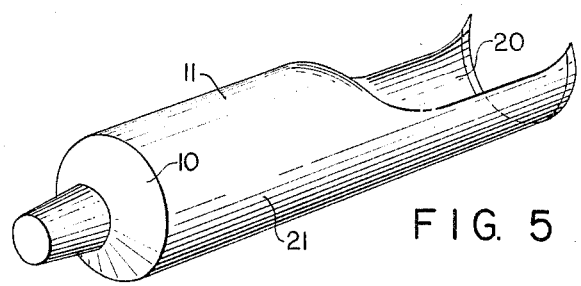
FIGURE 5 is a perspective view showing the shape of the tube after squeezing out part of the contents.

The finished tube has, when empty, the shape shown in FIGURE 4. Its rear end 18 remains flared thus facilitating the filling operation of the tube. After closure of this end 18 by welding, the filled tube has the appearance of any other plastics tube made in known manner. However, as the contents of the tube 11 are progressively squeezed out, its skirt 13 tends to resume elastically the concave-convex shape imparted to it during the manufacture. FIGURE 5 shows the shape of the tube 11 when it is partly empty. The tube will thus automatically give to the user a clear and unmistakable visual indication of the amount of substance inside the tube.

Figure 3:
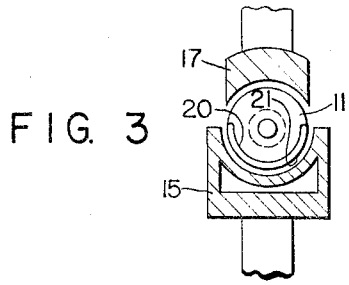
FIGURE 3 is a section taken along line III—III of FIGURE 2.

The apparatus shown in FIGURES 6 to 9 comprises a modified form of device for imparting to the skirt of the tube 11 a concave-convex shape. This modified device includes a shell-like member 22, similar to the member 15 in FIGURES 1 to 3, whose concave supporting surface is cooled, for example, by water circulation, and a heated member 23 having a convex deforming surface substantially complementary to the concave supporting surface of the member 22 (see FIGURES 7 and 9). The servo-motor for actuating the member 23 is adapted to move the latter into the shell-like member 22 and to press the skirt 13 of the tube 11 between these members 22 and 23 thereby to impart to the skirt 13 its concave-convex shape (see FIGURES 8 and 9).

In this second constructional form, the rear end portion 18 of the tube 11 is not flared as in the case of the tube shown in FIGURE 4.

Since the final shaping of the skirt 13 of the tube 11 between the members 22 and 23 is effected by relative displacement of the members 23 and 23 towards one another, there is no need for air to be sucked out from the tube 11 and the step of imparting to the skirt 13 its concave-convex cross-section may take place when the core 2 has already been fully retracted into the nozzle unit 1 of the apparatus.

Many constructional forms of the device for imparting to the skirt of the tube 11 the preferred concave-convex shape could be devised. Thus, the member 23 which is intended to impart to the part 20 of the skirt 13 an externally concave shape could consist of a wheel or roller which can be rolled along the tubular skirt 13 to cause its deformation. A device could also be devised which deforms part 20 of the tubular skirt 13 after formation of the latter and which pinches the edges of this deformed part so that the latter keeps, when empty, the shape imparted to it.

In the embodiments described above, the device for imparting to the skirt 13 of the tube 11 a concave-convex shape, forms a part of the tube forming apparatus. It should be understood, however, that this device could be independent of the tube forming apparatus, the tubes being then treated in the device after removal from the tube forming apparatus.

Various thermoplastic molding materials may be used, as, for example, plasticized vinyl-chloride, and some of the other vinyl molding compounds, as well as cellulose plastics, such as cellulose acetate, cellulose nitrate, or ethyl cellulose, or such other plastics as may suit themselves to the article which is to be formed.

I claim:

1. A method of producing a collapsible tube adapted for housing and dispensing a flowable commodity, said tube being fabricated from a flexible resinous thermoplastic material having a "memory," said tube having a generally tubular body portion and an integral head portion at one end of said body portion, the head portion having a dispensing passageway; said method comprising the step of deforming part of said body portion by application of heat and pressure differential to the part to cause the part to become more readily deformable than the remainder of the tube and to annul the convexity thereof, said part being a major segment of only an axial half of said body portion and said part being deformed to lie adjacent to and spaced from a corresponding part of the other axial head of said body portion such that said part may be flexibly expanded to its position prior to deformation upon filling the tube with said commodity and the part will return to its deformed position due to said "memory" upon dispensing the commodity from the tube.

2. Method according to claim 1 wherein the pressure differential is a vacuum within the tube.

3. A method of making a flexible resinous thermoplastic collapsible tube having a generally tubular body portion and an integral head portion at one end of said body portion, said method comprising the steps of injecting heated plastic material through a nozzle into a space between the die member and an end face of a core extending through said nozzle to form said head portion, simultaneously axially moving said end face of the core and said die member away from the nozzle and extruding heated plastics material around said core to form said body portion, fully withdrawing the core from said body portion, and pressing the body portion between a first shell-like member having a concave cooled surface and a second cooperating shell-like member having a convex heated surface to deform a major segment of one axial half of said body portion to cause the inner surface of said part to lie substantially adjacent the inner surface of the corresponding part of the other axial half of said body portion having a concave configuration while retaining the convex configuration for the outer surface of said other axial half of the body portion, such that the concave body portion may be flexibly extended to its position prior to deformation and it will return to its deformed position due to said "memory."

References Cited by the Examiner

UNITED STATES PATENTS

| | | | |
|---|---|---|---|
| 1,219,263 | 3/1917 | Davis | 222—95 |
| 1,870,903 | 8/1932 | Giesler. | |
| 2,326,041 | 8/1943 | Lavallee | 264—92 |
| 2,418,155 | 4/1947 | Bogoslowsky | 264—296 |
| 2,422,325 | 6/1947 | Wheelon | 264—320 XR |
| 2,443,053 | 6/1948 | Parmelee | 264—296 |
| 2,748,455 | 6/1956 | Draper et al. | |
| 2,803,695 | 8/1955 | Woller et al. | |
| 2,804,995 | 9/1957 | Fee | 222—95 |
| 3,022,614 | 2/1962 | Dreyfus et al. | |
| 3,051,605 | 8/1962 | Stannard | 264—90 XR |
| 3,109,198 | 11/1963 | Guignard. | |

ROBERT F. WHITE, *Primary Examiner.*

ALEXANDER H. BRODMERKEL, *Examiner.*

J. R. DUNCAN, M. R. DOWLING, *Assistant Examiners.*